Aug. 22, 1961

J. HOHL 2,996,853

CLOSURE APPLYING METHOD

Filed Feb. 19, 1959

INVENTOR.
JOHN HOHL
BY
Mead, Browne, Schuyler and Beveridge
ATTORNEYS

Aug. 22, 1961  J. HOHL  2,996,853
CLOSURE APPLYING METHOD
Filed Feb. 19, 1959  7 Sheets-Sheet 5

INVENTOR.
JOHN HOHL
BY
Mead, Browne, Schuyler and Beveridge
ATTORNEYS

Aug. 22, 1961  J. HOHL  2,996,853
CLOSURE APPLYING METHOD
Filed Feb. 19, 1959  7 Sheets-Sheet 7

INVENTOR.
JOHN HOHL
BY
Mead, Browne, Schuyler and Beveridge
ATTORNEYS

United States Patent Office 2,996,853
Patented Aug. 22, 1961

2,996,853
CLOSURE APPLYING METHOD
John Hohl, Toledo, Ohio, assignor to Owens-Illinois
Glass Company, a corporation of Ohio
Filed Feb. 19, 1959, Ser. No. 794,360
5 Claims. (Cl. 53—42)

The present invention relates to a closure applying method. More particularly, this invention relates to an apparatus and method for the application of threaded closures to correspondingly threaded necks or finishes of containers or the like.

In issued United States Patent No. 2,783,597 to Hohl and Pellett, assigned to the assignee of the present invention, there is disclosed and claimed a novel sheet metal closure for application to a container, such as a glass jar or bottle. Of particular interest in this patent is the use of quite thin deformable sealant films on the interior of the cap and the deformation of the cap to conform to the inherent unevenness of the container rim.

By the use of the apparatus and method hereinafter set forth, improved sealing of threaded closures on threaded container finishes may be obtained. Sealant films thicker than those proposed in said Patent 2,783,597 may be utilized herein with the thickness of the film being correlated with the deformation thereof, so that the film thickness intermediate the finish and the cap interior surface remains substantially within the limits disclosed in the patent, No. 2,783,597.

The term "threaded" is used herein in a generic sense to include not only closures and finishes having full helical threads, but also closures and finishes having interrupted or partial threads, such enclosures and finishes being commonly denoted in the art as "lug" closures and finishes.

Generally, the present invention proposes the application of an inherently resilient metallic cap to a container by relatively rotating the cap and container while simultaneously resiliently applying an axial force of sufficient magnitude to deform the cap to an extent well within the elastic limits of the closure material.

In a threaded closure, the closure threads normally are carried by an axially elongated skirt joined to the cap upper surface radially outwardly of the annular free edge or rim of the container finish. The substantial axial forces are applied to this radially outward portion of the cap to resiliently distort the cap about the annular container rim as a reaction point so that the skirt is, in effect, elongated. At the same time, the resiliently applied axial force will conform those cap portions overlying the annular finish rim to any irregularities in the rim and substantial "flow" of the sealant film on the cap inner surface will occur to reduce the effective thickness of the sealant film to a point at which substantial diffusion or permeation of gases and vapors cannot occur through the reduced metal-glass space.

As the cap and finish threads are relatively rotated, the threads are moved into abutment as the axial force is maintained and as the skirt is elongated. Such maintenance of the axial force will place the elongated skirt under tension and will leave those portions of the cap radially outward of the annular container finish rim slightly distorted into accurate conformity with the rim because of the attempted elastic return of the cap to its pre-distorted shape.

The apparatus herein disclosed provides an improved closure applying mechanism including a resiliently distortable chuck of essentially annular shape drivingly connected through a friction clutch to a rotatable spindle capable of applying both axial and rotative forces to the closure. The specific clutch and chuck design provides a low-inertia overrunning clutch in which the closure-chuck contact friction is always in excess of the friction clutch torque capacity, so that a constant turning movement of predetermined torque value is applied to the closure without danger of closure scratching or damage. If desired, magnetic closure-retaining means may be utilized to simplify the supply of closures and to retain the closure in accurate alignment with the container finish before and during closure application.

It is, therefore, an important object of the present invention to provide an improved method for the application of threaded closures to a correspondingly threaded container finish or the like and in which the closure is applied under simultaneous torque and axial forces.

Another important object of this invention is the provision of an improved closure-applying apparatus including an improved friction clutch capable of applying both axial and rotative forces to the closure so as to distort the cap into snug engagement with the container finish.

It is a further object of this invention to provide an improved method for the application of a threaded closure to a container finish by relatively rotating the closure and the finish while simultaneously urging the closure and finish into abutment under a force sufficient to resiliently distort the cap so as to elongate the skirt and maintaining the elongated skirt under tension after the removal of the axial distorting force.

Yet another object of this invention is the provision of an improved closure-applying mechanism wherein a resiliently distortable, essentially annular rubber chuck is actuated both rotatively and axially to thread a closure onto a container finish under a predetermined rotative torque load transmitted through a friction clutch of low inertia.

It is a still further important object to provide an improved method for the application of an inherently resilient metallic cap having a depending skirt bearing threads to the threaded annular rim of a container under a predetermined maximum torque load while simultaneously applying an axial distorting force to those cap portions lying radially outside the container finish so as to elongate the closure skirt while tightening the threaded closure to the extent of the predetermined torque.

Other and further objects and advantages of the invention will appear from the following detailed description taken in conjunction with the annexed drawings, in which:

On the drawings:

FIGURE 9 is a vertical sectional view through a multi-head closure-applying apparatus utilizing a closure-applying head of the present invention;

As shown on the drawings:

The embodiment of FIGURES 1–8 and 13

Figure 1:
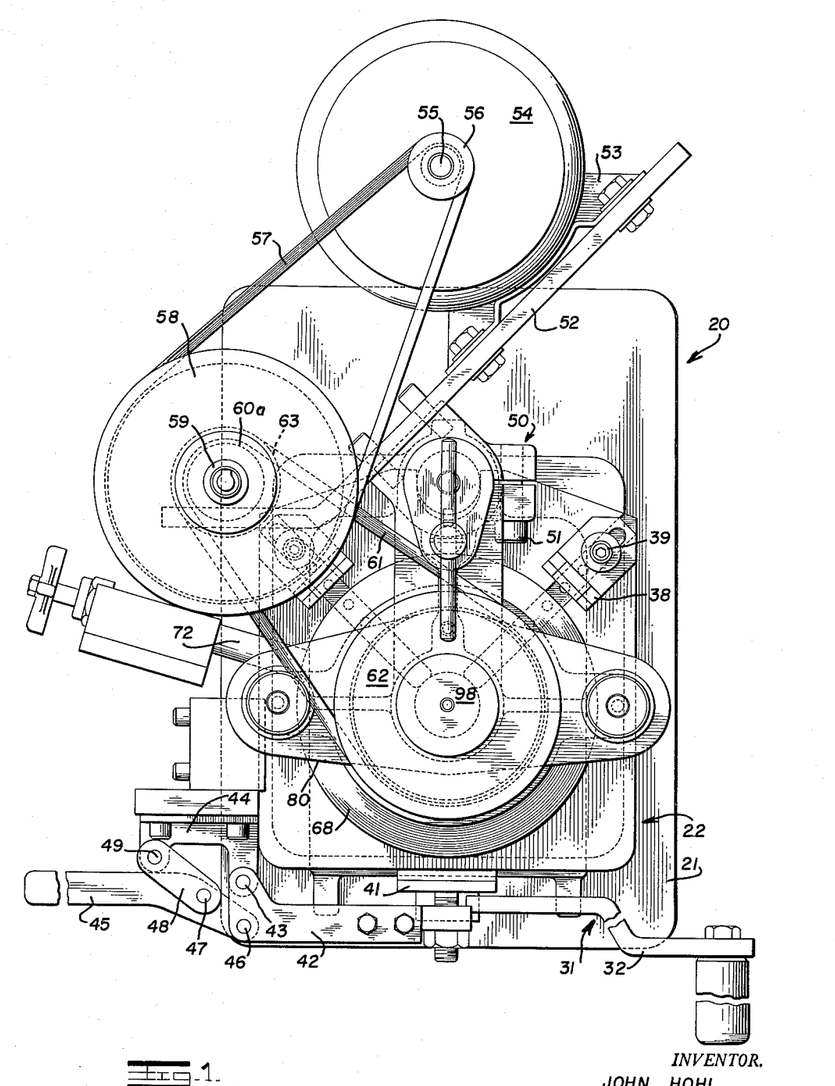
FIGURE 1 is a plan view of one embodiment of the apparatus of the present invention.
Figure 2:
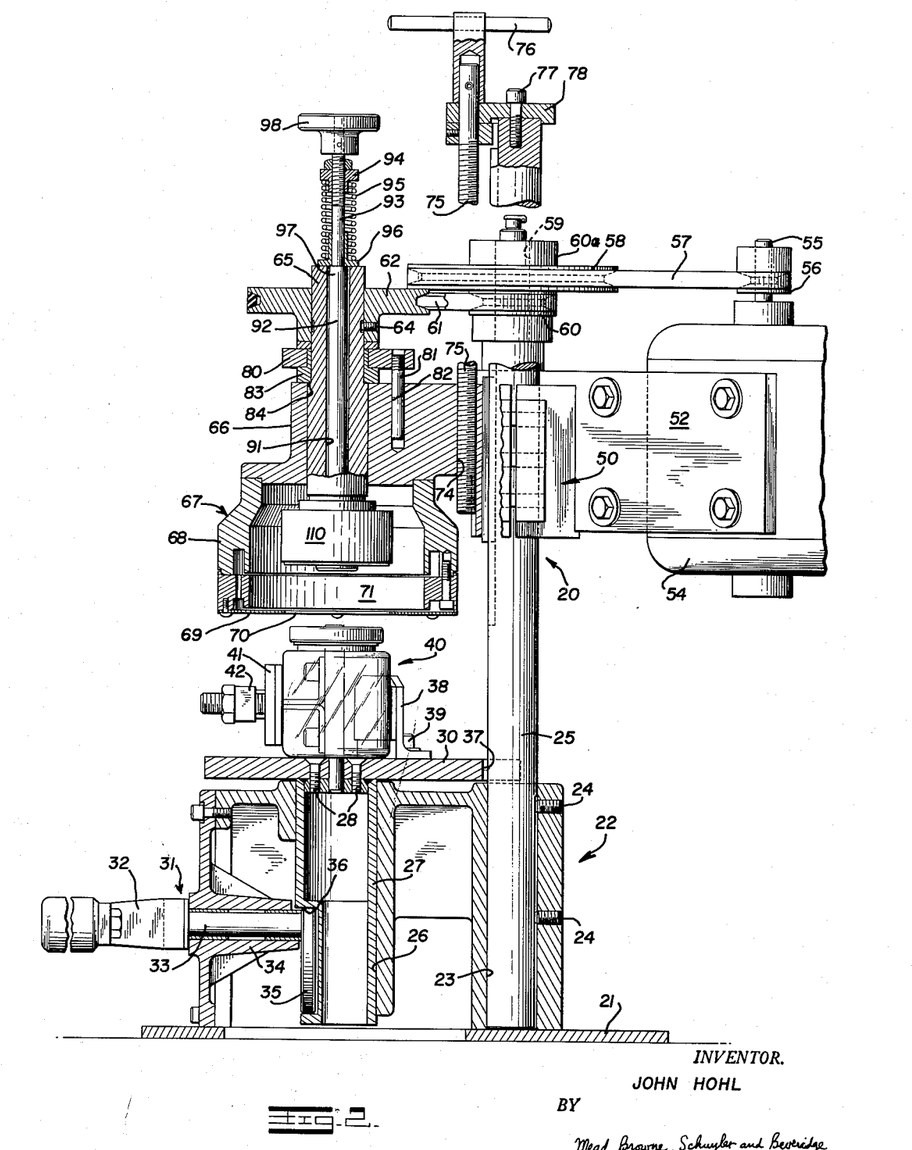
FIGURE 2 is a side elevational view, with parts broken away and in section, of the apparatus of FIGURE 1.
Figure 3:
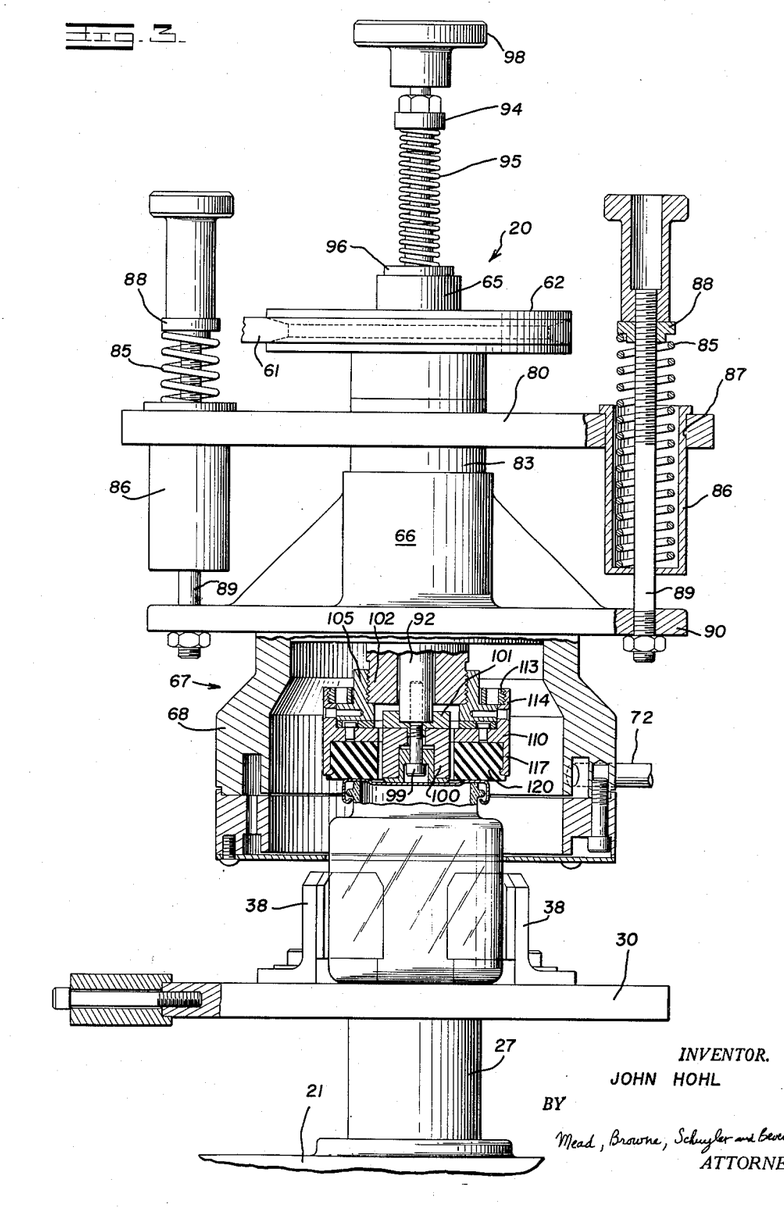
FIGURE 3 is an end elevational view, with parts broken away and in section, of the invention of FIGURE 1.

In FIGURES 1–3, inclusive, reference numeral 20 refers to a closure applying apparatus of the present invention illustrated as supported by a lower base plate 21 having secured thereto an upstanding base 22 provided with a vertically extending recess 23 adjacent one marginal edge in which is positioned, as by set screws 24, a vertically upstanding support post 25.

Parallel to the recess 23 and located substantially centrally of the base 22 is a second vertically extending recess 26 within which is disposed a vertically reciprocable sleeve 27 having secured thereto by suitable means, as by screws 28, a support plate 30. The support plate 30 and the sleeve 27 are adapted to be reciprocated vertically by means of a laterally projecting crank shaft 31 including an offset handle 32, a medial shaft 33 journaled in a lateral boss 34 fixedly secured to the base 22, and a generally circular cam 35 mounted eccentrically on the inner end of the shaft 33 and contacting a cam track 36 formed in the periphery of the sleeve 27. The support plate 30 is notched, as at 37, at its periphery to receive the post 25, thereby preventing rotation of the plate 30 and the sleeve 27 relative to the base 22. It will be appreciated that rotative movement of the crank handle 32 will elevate the support plate 30 from its position illustrated in FIGURE 2 to its raised, operative position illustrated in FIGURE 3.

Disposed on the support plate 30 are a pair of angularly related abutments 38 secured to the plate 30 by suitable means, as by cap screws 39. These abutments 38 serve to retain a container or the like 40 on the support plate 30. To fix the container 40 in position upon the plate 30, a pivotal clamping plate 41 (FIGURE 1) is provided for cooperation with the abutments 38. This clamping plate 41 is threadedly retained on an actuating arm 42 pivoted at 43 to a support bracket 44 carried by the base 22. An actuating handle 45 is pivoted to the arm 42, as at 46, and to a link 48, as at 47, which link is also pivoted to the bracket 44, as at 49. It will be appreciated that rotative movement of the handle 45 will throw the clamping plate 41 substantially radially of the sleeve 27 into clamping relation with the container 40, the clamping element 41 being illustrated in FIGURE 2 as occupying its clamping position.

Secured to the post 25 above the base 22 is a bracket 50 which is clamped onto the post by suitable means, as by cap screws 51 (FIGURE 1). This split bracket 50 has secured thereto a transversely extending mounting plate 52 carrying at one end a motor mounting bracket 53 for supporting a vertically disposed electric motor 54 having an output shaft 55 co-rotatable with a relatively small driving sheave 56. The sheave 56 of the motor 54 is lapped by a driving belt 57 which also laps a relatively larger drive sheave 58 mounted on a vertical shaft 59 through an anti-friction bearing 60a. Also mounted on the bearing 60a and underlying the upper drive sheave 58 is a second, relatively smaller sheave 60 driven by a second drive belt 61 which laps a relatively larger input sheave 62 secured to the upper end of a drive spindle 65 by suitable means, as by a set screw 64. It will be appreciated that the spindle 65 is driven by the sheaves 56, 58, 63 and 62 at a rate of speed substantially slower than the output speed of the motor shaft 55, but at a correspondingly greater mechanical advantage.

The spindle 65 is journaled for rotation within a housing 66 carried by the bracket 50 and having a lower depending bell 67 defined by an annular peripheral wall 68 having secured to the lower end thereof an annular closure plate 69 having a central opening 70 cooperating with the bell 67 to define an interior steam chamber 71 communicating with a source of steam through a conduit 72.

The housing 66 is provided with a vertical threaded passage 74 into which is threaded an adjustment screw 75 carrying at its upper end a handle 76 and secured, as by cap screw 77 and an attachment bracket 78, to the upper end of the upstanding post 25. Rotation of the handle 76, after loosening of the bracket screws 51, will accommodate unitary vertical adjustment of the bracket, the drive mechanism and the housing 66 vertically of the post 25 to accommodate utilization of the apparatus in conjunction with containers 40 of varying height.

Interposed between the sheaves 62 and housing 66 is a crosshead 80 carrying a depending pin 81 slidably entered in a recess 82 of the housing to prevent relative rotation between the crosshead 80 and the housing 66. Interposed between the crosshead 80 and spindle 65 is a bearing 83 seated upon an external radial shoulder 84 formed on the spindle 65. This crosshead 80 is utilized to spring load the spindle 65 downwardly within the housing 66 by virtue of compression springs 85 interposed between dished cups 86 mounted in vertical apertures 87 formed in the lateral extremities of the crosshead 80 and threaded adjustment nuts 88 mounted on upstanding bolts 89 which react against a fixed reaction crosshead 90 provided by lateral projections formed integrally with the housing 66. Attempted vertical displacement of the spindle 65 from its position illustrated in FIGURE 2 of the drawings will, through the shoulders 84 and bearing 83, attempt to displace the crosshead 80 upwardly, and this upward displacement will be resisted by the compression springs 85.

The spindle 65 is provided with an axial bore 91 within which is disposed a vertically displaceable actuating rod 92 threaded at its upper end, as at 93, to receive an adjustable spring reaction element 94 retaining a compression spring 95 against a second reaction element 96 which is seated upon a radial shoulder 97 formed on the rod 92. It will be noted that the reaction element 96, when in its position of FIGURE 2, seats upon both the rod shoulder 97 and the upper free end of the spindle 65. Obviously, the rod 92 can be displaced downwardly within the spindle bore 91 against a compression of the spring 95 and a knob 98 surmounts the portion 93 of the rod 92 to facilitate such displacement. The spring 95 provides no resistance to upward displacement of the rod 93.

The lower end of the rod 92 is bored and tapped to receive a cap screw 99 threadedly retaining a permanent magnet 100 which is jointly displaceable with the rod 92, the magnet being interposed between a pair of pole pieces 101.

The lower end of the spindle 65 is exteriorly threaded, as at 102, to receive thereon a correspondingly threaded upper clutch element 105 having a lower clutch face 106. Surrounding the upper clutch element 105 is a cage 110 rotatable relative to the clutch element 105 and having a medial inwardly directed radial flange 111 provided with an upper clutch surface 112 opposing and spaced from the clutch surface 106. The lower clutch cage 110 is mounted on the upper clutch element 105 by means of an internal retainer ring 113 which is threaded into an upwardly projecting, internally threaded annular flange 114 on the cage 110. The two clutch faces 106 and 112 are vertically spaced and interposed therebetween is an annular friction disk 115 co-rotatable with the cage 110 by means of depending drive pins 116 projecting downwardly through the disk 115 and into the internal flange 111 of the case 110.

The cage 110 is also provided with a depending lower annular flange 117 surrounding and retaining against both relative rotation and relative axial movement a toroidal rubber chuck 120 generally radially aligned with and surrounding the permanent magnet 100.

It will be seen from FIGURES 4 through 8 that the container 40 comprises a generally cylindrical container body 40a having an external shoulder 40b joining the cylindrical portion 40a to an upwardly extending finish or neck 40c which is provided with a radially enlarged threaded portion, preferably in the form of an arcuate, partially helical lug 40d the under surface of which provides an inclined ramp or cam surface 40e. The container 40 is adapted for utilization in connection with the closure 125 comprising a central circular web portion 125a merging with an annular rim portion 125b adapted to overlie the annular upper extremity 40f of the bottle finish 40c. This rim portion is joined, through an annular merging or turning portion 125c, to a depending annular skirt 125d which terminates in an inturned flange 125e which is turned back upon itself to form an upper, helical partial thread or lug 125f.

The device heretofore described is particularly applicable to the "vacuum packing" of foodstuffs or the like. High pressure steam is fed into the bell enclosure 67 through steam line 72 (FIGURES 1 and 3) and this steam displaces the air or vapor normally occupying the upper extremity of the container 40 above the contents thereof. Upon fluid-tight sealing of the container-closure package and subsequent cooling, the steam condenses to create a partial vacuum therein.

In operation of the device of FIGURES 1 through 7, the container lid 125 is preferably loosely placed upon the container finish 40c, the container 40 is clamped in position upon the support platform 30 through the cooperating abutments 38 and removable clamping plate 41. Next, the crank arm 32 is manually actuated to turn the eccentrically mounted cam 35 so as to elevate the container 40 and the finish 125 to the position illustrated in FIGURE 3 of the drawings.

Since at this time the motor 54 is effective to drive the spindle 65, and the magnet 100, or more specifically the magnet pole piece 101, depends below the chuck 120, the metallic lid or closure 125 is attracted by the magnet and can be removed from the container either before or after elevation of the container 40. In any event, the closure 125 is held in coaxial aligned relation with the container 40.

Further upward movement of the container 40 now brings the container into contact with the rotating closure 125 held by the magnet and turned by the spindle 65. At the initiation of such movement, the closure 125 and the container 40 occupy their positions illustrated in FIGURE 4 of the drawings and upon continued relative rotation, the lug 125f of the closure is entered beneath the corresponding lug rod 40d of the container 40, as illustrated in FIGURE 5.

Figures 4, 5, 6, 7, 8:
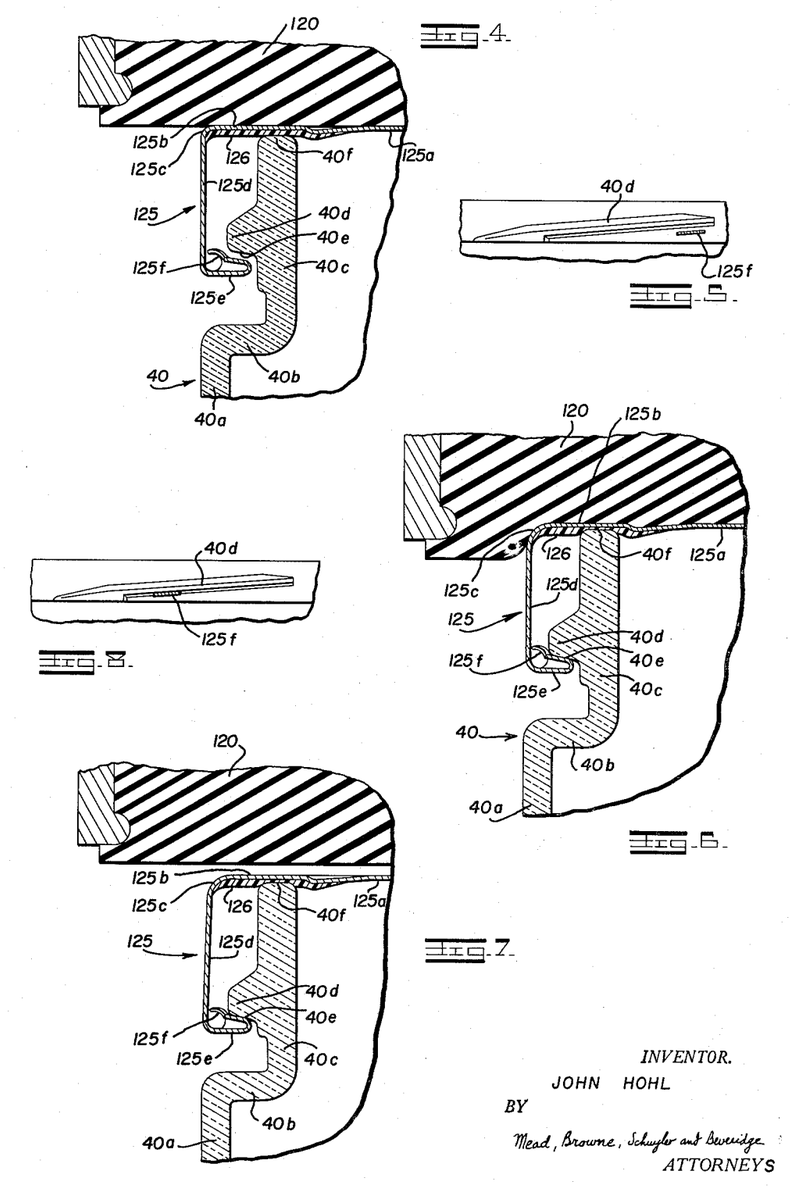
FIGURE 4 is a greatly enlarged vertical sectional view through a container finish and closure at an initial stage of the operation of the apparatus of FIGURES 1 through 3.
FIGURE 5 is an enlarged developed view illustrating the relative positions of the threaded finish and closure when in the condition of FIGURE 4.
FIGURE 6 is a view similar to FIGURE 4 illustrating a successive position of the container and finish.
FIGURE 7 is a view similar to FIGURES 4 and 6 illustrating the finally applied finish and closure.
FIGURE 8 is a view similar to FIGURE 5 illustrating the relative positions of the threads when in the condition of FIGURE 7.
Figure 5:
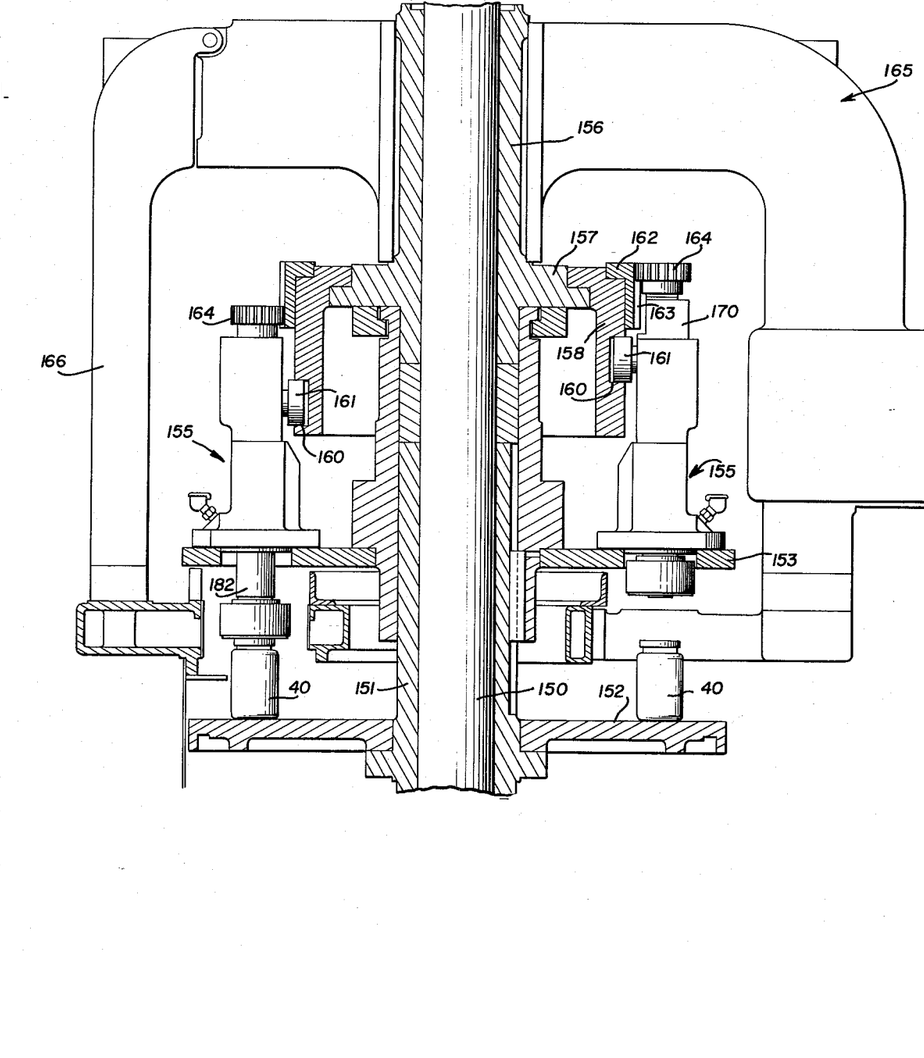

As further illustrated in FIGURE 4 of the drawings, the closure 125 is provided beneath the rim portion 125b thereof with a deformable sealant film 126 formed of a suitable plastic material and preferably of a thickness on the order of 0.005 to 0.010 inch.

Further upward displacement of the container beyond the position illustrated in FIGURE 3 of the drawings and after contact between the chuck 120 and the closure 125 has been effected, will take place against the bias of the sleeve compression springs 85 which, in effect, pre-load the sleeve 65 downwardly. The resistance to upward displacement of the sleeve 65 is greater than the deformation resistance of the chuck 120, so that the chuck 120 will be deformed by the pressure of the closure upwardly thereagainst, as best illustrated in FIGURE 6 of the drawings.

It will be noted that the compression spring 95 does not resist upward movement of the magnet 100, inasmuch as the length of the magnet springs 95 are not changed by upward displacement of the rod 92 and the shoulder 97 thereof. Accordingly, the magnet moves freely upwardly to accommodate compression distortion of the clutch 120.

The compression of the chuck 120 under the resistance of the springs 85 will force the clutch faces 106 and 112 into engagement with the opposite radial surfaces of the clutch disk 115, materially increasing the torque capacity of the overrunning clutch and accommodating the transmission of substantial turning forces from the motor 54 to the closure 125.

The manner of distortion of the chuck 120 is best illustrated in FIGURE 6 of the drawings from which it will be seen that the primary distortion of the chuck occurs substantially in alignment with and radially outwardly of the upper edge or rim 40f of the container 40 serving as an annular reaction zone. The plastically deformable film 126 interposed between the closure 125 and the rim 40f will be compressed and, accordingly, will cold flow to either side of the container rim 40f with the effective thickness of sealant between the closure and the glass rim being reduced, thereby reducing the gaseous permeability of the film.

The chuck 120 is preferably formed of rubber or the like resilient material and, while being resiliently deformable, is not compressible so as to provide substantial resistance to deformation, and this resistance results in the downward deformation of the annular turning portion 125c of the closure. In effect, such deformation of the closure vertically elongates the depending flange or skirt 125d of the closure. This elongation of the skirt is effected so long as the downward force of the chuck is continuously exerted on the closure by the chuck 120.

The continued rotation of the closure 125 by the chuck 120 will relatively rotate the lugs 125f and 40e until such time as they come into snug abutment and until further such relative turning movement is resisted by a force in excess of the torque capacity of the friction clutch comprising the friction faces 106 and 112 and the interposed friction disk 115. At this time, further relative rotation will be taken up within the friction clutch, and the overrunning clutch action will become effective. At this time, the closure is fully applied and the chuck 120 can be moved relative to the container 40, as by rotation of the crank arm 32 to lower the container 40 out of engagement with the chuck.

Due to the threaded engagement between the lugs 125f of the closure 125 and the surfaces 40e of the container finish 40c, the cap will remain in its applied position, the compression of the elastically deformable film 126 will be maintained, and the skirt 125d, having been elongated, will remain elongated and under tension due to the attempted return of the elastically deformable skirt 125d of the closure 125 to its original configuration.

Figures 10, 11, 12:
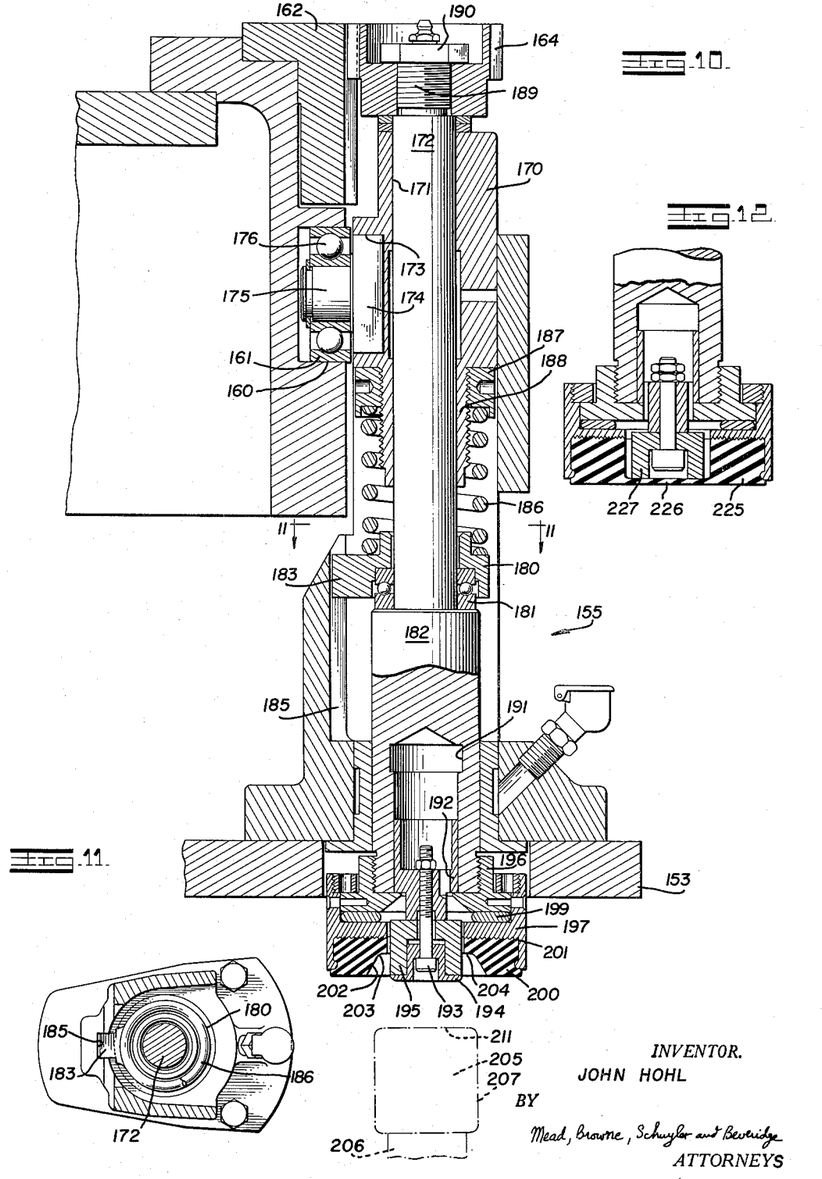
FIGURE 10 is an enlarged, fragmentary, vertical sectional view of the closure applying head of FIGURE 9.
FIGURE 11 is a sectional view taken along the planes 11—11 of FIGURE 10.
FIGURE 12 is a sectional view of a modified closure-applying head of the present invention.
Figure 13:
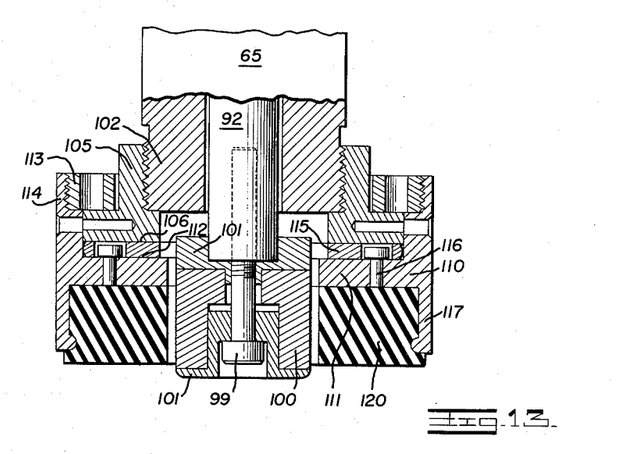
FIGURE 13 is an enlarged fragmentary view similar to FIGURE 3, illustrating the closure applying apparatus in greater detail.

*The embodiment of FIGURES 9, 10 and 11*

As hereinbefore explained in connection with the embodiments of FIGURES 1–8, and 13, inclusive, the previously described form of the invention provides a novel clutch and chuck arrangement as utilized in conjunction with a single head, limited production closure applicator.

This same clutch and chuck arrangement may be advantageously utilized in conjunction with a multi-head machine which is usually known in the art as a "rotary vacuum machine."

Figures 14, 15:
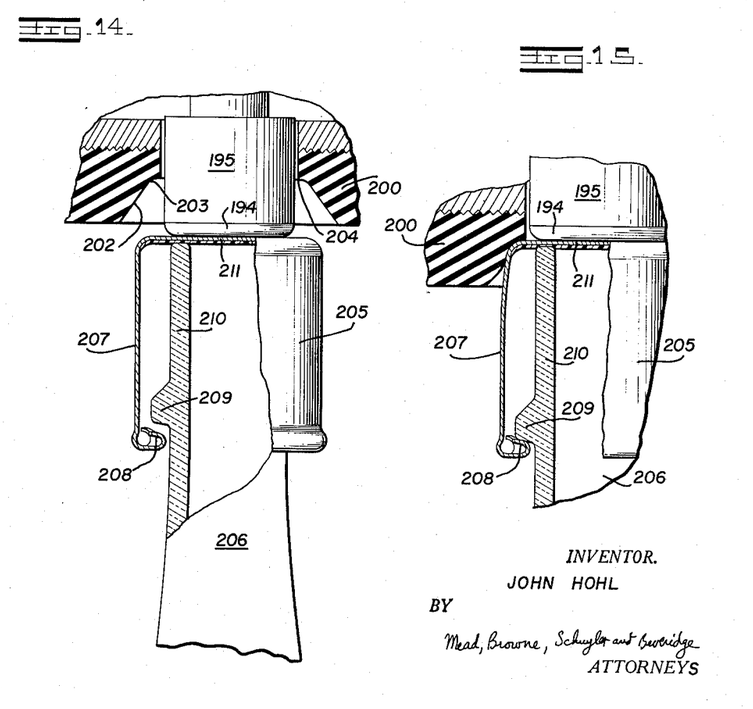
FIGURES 14 and 15 are greatly enlarged schematic views showing successive relative positions of the apparatus of FIGURES 9 through 11.

Such a machine is somewhat schematically illustrated in FIGURE 9 of the drawings, wherein reference numeral 150 refers generally to a fixed upstanding center post provided with an annular rotatable collar 151 which carries laterally directed support surfaces 152 adapted for rotation about the center post and upon which the previously described containers 40 (FIGURE 9) or different containers 206 (FIGURES 10, 14 and 15) are adapted to be positioned. This rotatable collar 151 also carries a radially directed support plate 153 upon which are disposed a plurality of applicator heads 155, illustrated in detail in FIGURE 10 of the drawings. Also mounted upon the center post 150 is an upper fixed or non-rotatable collar 156 having a laterally directed flange 157 carrying a non-rotatable depending cam collar 158 having a helical cam track 160 on which runs a cam follower 161 adapted to vertically reciprocate the head 155 (in a manner to be hereinafter more fully described) as the head is rotated by its carrying plate 153.

Carried by the collar 156 is fixed annular bull gear 162 having vertically disposed teeth 163 of substantial vertical extent meshing with spindle spur gears 164. The vertical extent of the spur gear teeth is such that co-rotation between the bull gear 162 and the spindle gears 164 is maintained throughout the entire vertical movement of the heads 155. Inasmuch as the packing operation is performed under vacuum by the well known steam process, the heads during their passage about the vertical column 150 are confined within an enlarged shroud 165, including depending pivotal shroud sections 166 which are movable for convenient access to the heads and the remainder of the apparatus.

As best illustrated in FIGURE 10, the cap applicator head comprises generally a substantially cylindrical casing 170 having an axial bore 171 within which is positioned a vertical spindle 172. Casing 170 is provided with an open sided recess 173 in which is disposed a cam roll supporting block 174 having a protruding cam roll stud 175 upon which the cam roll 161 is supported by suitable means, as by anti-friction bearing 176.

The spindle 172 is supported in casing 170 by means of a lower spring support 180 contacting a lower roller bearing 181 mounted between the spring support 180 and a radially enlarged shoulder 182 former on the spindle. This lower spring support 180 projects laterally, as at 183, for insertion into a notch 185 formed in the lower portion of the casing 170. A compression spring 186 is interposed between the lower spring support 180 and an upper spring support 187 threaded onto an internal stud formed integrally with the casing. The upper end of the spindle 170 has secured thereto, as by threads 189 and a nut 190, the spindle spur gear 164 for cooperation with the gear 162 as heretofore described.

The lower end of the spindle 172 is provided with an interior recess 191 within which is slideably mounted a tubular magnet carrier 192 having a depending bolt 193 carrying a lower magnet pole piece 194 by means of which a permanent magnet 195 is retained. The spindle is threaded at its lower portion to threadedly receive an upper clutch element 196 which is similar to the element 105 hereinbefore disclosed in connection with the embodiment of FIGURES 1 through 8 and a lower clutch cage 197 similar to the lower clutch element heretofore described. Interposed between the two clutch elements is an annular friction disk 199.

Carried by the lower clutch element 197 is a rubber chuck 200 essentially the same in composition and function as the element 120 described in connection with the embodiment of FIGURES 1 through 8 hereof with two notable exceptions. First, the rubber chuck is provided at an upper surface with corrugations 201 which cooperate with corresponding corrugations formed in the lower clutch element 197 to insure co-rotation between the lower clutch element and the chuck. Secondly, the chuck 200 is provided with an interior recess concentric with the magnet 195 and comprising an upper and inwardly sloping frusto-conical wall 202 merging through an arcuate medial portion 203 with a substantially radial upper portion 204.

As best shown in FIGURE 12, the lowering of the spindle 172 by means of the cam track 160 lowers the frusto-conical surface 202 of the chuck 200 into engagement with the cap 205 to be applied to a container 206. It will be noted that this cap 205 is provided with relatively deep, vertically elongated annular skirt 207 provided with terminal under-turned lugs 208 engageable with the under surfaces of lugs 209 of the container finish 210. Deformation of the radial upper portion 211 of the cap will be accomplished as hereinbefore explained in connection with FIGURES 4 through 8 with resulting elongation of the skirt 207 and the tensioning of the skirt 207 in its applied condition after the deforming force applied by the chuck 200 has been removed.

The embodiment of FIGURE 12

In FIGURE 12 another modified form of chuck is illustrated which is substantially the same as that utilized in conjunction with the embodiment of FIGURES 1 through 8, with the exception that the molded rubber chuck 225 is provided with an integral web portion 226 which projects radially thereacross to join the toroidal cap-applying portions thereof and to underlie the permanent magnet 227. As a result, a simplified chuck and magnet structure is obtained and any possibility of scratching the exposed upper surface of the closure 125 is eliminated.

General summary

As hereinbefore explained in detail in connection with three different specific embodiments of the present invention, the apparatus provides an improved applicating head which is particularly adapted for utilization in conjunction with threaded container finishes and caps or closures.

The utilization of the resiliently deformable cap applying chuck possesses several advantages. One such advantage results from the fact that several sizes of caps can be applied with the same chuck. A second advantage resides in the fact that the resilient distortion of the chuck about the annular resistance surface provided by the upper finish edge deforms the closure only radially outwardly of the finish.

The concurrent application of relative rotational and axial forces to the closure-container combination is provided in order that the advantages of closure deformation can be permanently obtained upon the threaded engagement of the closure and the container against further relative movement either axially or rotationally. The progressive helical movement of the closure to locked position is accomplished while the closure is deformed, such helical movement occurring rapidly, but progressively, until such time as the slippage within the overrunning clutch occurs.

One other advantage of the resilient chuck resides in the relatively larger coefficient of friction between the chuck and the closure (preventing chuck-closure relative rotation) than between the clutch elements, thus insuring full application of the closure at an accurately predetermined torque value sufficient to maintain the closure skirt under tension.

The usage of the magnetic closure retention means is advantageous in that it provides a fool-proof, easily utilized means of closure delivery and closure-finish alignment. Other closure delivery means may be utilized if desired or necessary in any given apparatus.

One other less obvious advantage to the usage of the resilient chuck resides in the possibility of applying "snap-on" lids or closures such, for example, as are illustrated in United States Patent No. 2,783,597, "lug" closures, and/or "full thread" closures by the use of a single applicator head.

Surprisingly, it has been found that the release torque, such as that manually applied during the unthreading of a threaded closure, of closures applied as herein proposed is not materially greater than the release torque required in the manual release of conventionally applied closures. This unexpected advantage is probably obtained because of the tensioned closure skirt which, in attempting to resume its tension-free or natural state, tends to unwind itself on the finish threads after initial release. At the same time, however, no instances of spontaneous unwinding or release have been observed.

In conclusion, this invention proposes a novel approach to the application of threaded closures to correspondingly threaded container finishes by the deliberate and controlled distortion of the closure well within the elastic limit thereof and the utilization of the attempted elastic return of the closure to insure vapor tight, conforming contact between the closure and the container. The closure deformation is obtained entirely radially outwardly of the container finish rim, so as to elongate axially the thread-bearing closure skirt, thus increasing the relative rotational displacement necessary for full threaded closure-finish engagement and such full engagement maintains the skirt elongated to tension the closure tightly against the finish without excessive resistance to subsequent manual rotation during closure removal.

While preferred embodiments have been described above in detail it will be understood that numerous modifications might be resorted to without departing from the scope of the invention as defined in the following claims.

What is claimed is:

1. In a method of applying to a container having an annular rim and a threaded finish therebeneath an inherently resilient completely formed and threaded closure having an annular skirt telescopic over said finish into threaded engagement therewith, the steps of contacting said rim with the undersurface of said closure radially inwardly of said skirt, relatively rotating said closure and said container while subjecting that portion of the closure radially outwardly of said rim to an axial force of sufficient magnitude to elastically deform the closure and to elongate the skirt axially of the neck, continuing the relative rotation and the axial force until a predetermined relative torque load is attained and relative rotation no longer occurs, and then releasing the axial force so that attempted elastic return of the closure imposes a substantial tensile stress on said closure skirt.

2. In a method of applying to a container having an annular rim and a threaded finish therebeneath an inherently resilient closure having a central web of greater diameter than said rim and joined to an annular skirt provided with thread elements telescopic over said finish into threaded engagement therewith, the steps of contacting said rim with the undersurface of said closure, relatively rotating said closure and said container at a less than predetermined torque, elastically deforming axially those portions of said web and skirt lying radially outwardly of the container rim to increase substantially the extent of closure-finish relative rotation necessary for full threaded closure-finish engagement, and continuing the relative rotation and the axial force until a predetermined relative torque load is attained and such full threaded engagement results.

3. In a method of applying to a container having an annular rim and a threaded finish therebeneath an inherently resilient closure having a web bearing an interior plastically deformable sealant film and an annular skirt telescopic over said finish to bring thread elements on the skirt into threaded engagement with the finish, said skirt and said web being joined through a curved merging portion, the steps of contacting said rim with the interior sealant film of said closure radially inwardly of said skirt, relatively rotating said closure and said container while subjecting that portion of the closure radially outwardly of said rim to an axially downward force of sufficient magnitude to elastically deform the closure web and merging portion so as to shift the skirt axially downwardly relative to the neck, said sealant film being plastically deformed to less than its original thickness, and continuing the relative rotation and the axial force until a predetermined relative torque load is attained and relative rotation no longer occurs.

4. In a method of applying to a container having an annular rim and a threaded finish therebeneath an inherently resilient closure having a central web joined through an annular merging portion to an annular skirt provided with pre-formed thread elements; threadedly engageable with said finish, the steps of telescoping said closure over said finish to contact said rim with the undersurface of said closure web, simultaneously interposing said closure between said rim and a resilient chuck, concurrently rotating said chuck and said closure to thread the closure onto said container, simultaneously elastically deforming the chuck and the closure web and merging portion radially outwardly of said rim to downwardly shift the closure thread elements, continuing the rotation and the closure deformation until a predetermined torque load is attained and the closure thread elements firmly engage the finish, and simultaneously ceasing rotation of said chuck and said closure while continuing said deformation, and then releasing the axial force, elastic return of the closure web and merging portion being prevented by the threaded closure-finish engagement.

5. In a method of applying an inherently resilient cap to a container having a rim overlying a finish having exterior threads, the cap having a central web and a skirt portion telescopic over said finish into threaded engagement therewith, by telescoping the cap skirt portion over the finish threads and relatively rotating the cap and container until the cap web is seated on the container rim, the steps of forcibly elastically deforming the cap outwardly of the rim-web contact area and above the threaded skirt portion thereof during relative rotation to increase the extent of telescopic movement of the cap over the finish, terminating relative rotation of the cap and the container when the cap, as deformed, is fully threaded onto the finish, and then terminating elastic deformation of the cap, any attempted elastic return of the cap urging the cap threaded portion into tight engagement with the threads of the finish.

References Cited in the file of this patent

UNITED STATES PATENTS

| | | |
|---|---|---|
| 1,684,892 | Sharp | Sept. 18, 1928 |
| 1,956,209 | Booth | Apr. 24, 1934 |
| 2,409,788 | Osborne | Oct. 22, 1946 |
| 2,656,084 | Filander | Oct. 20, 1953 |